United States Patent [19]
Pickett

[11] 3,873,368
[45] Mar. 25, 1975

[54] PRODUCTION OF CADMIUM ELECTRODES

[75] Inventor: David F. Pickett, Dayton, Ohio

[73] Assignee: The United States of America as represented by the Secretary of the Air Force, Washington, D.C.

[22] Filed: June 29, 1973

[21] Appl. No.: 375,239

[52] U.S. Cl. .................. 136/76, 136/24, 204/27, 204/96, 204/115
[51] Int. Cl. ................... C22d 1/22, H01m 35/30
[58] Field of Search .............. 204/114, 115, 96, 27; 136/76, 75, 24

[56] References Cited
UNITED STATES PATENTS
3,184,338  5/1965  Mueller .................... 136/76
3,573,101  3/1971  Beauchamp .............. 136/76

Primary Examiner—O. R. Vertiz
Assistant Examiner—Wayne A. Langel
Attorney, Agent, or Firm—Harry A. Herbert, Jr.; Cedric H. Kuhn

[57] ABSTRACT

A cadmium electrode is prepared by positioning a porous nickel plaque between two cadmium sheets immersed in an aqueous solution of cadmium nitrate having a pH of 3 to 5 and maintained at a temperature of 95° to 110°C. After connecting the nickel plaque to the negative pole and the cadmium sheets to the positive pole of a power source, direct current is passed through the solution at 1.2 to 1.6 amperes per square inch of plaque for from 8 to 20 minutes, thereby causing deposition of cadmium metal and cadmium hydroxide inside the pores of the plaque. A cadmium electrode so prepared is especially useful as the negative electrode in nickel-cadmium batteries.

7 Claims, 1 Drawing Figure

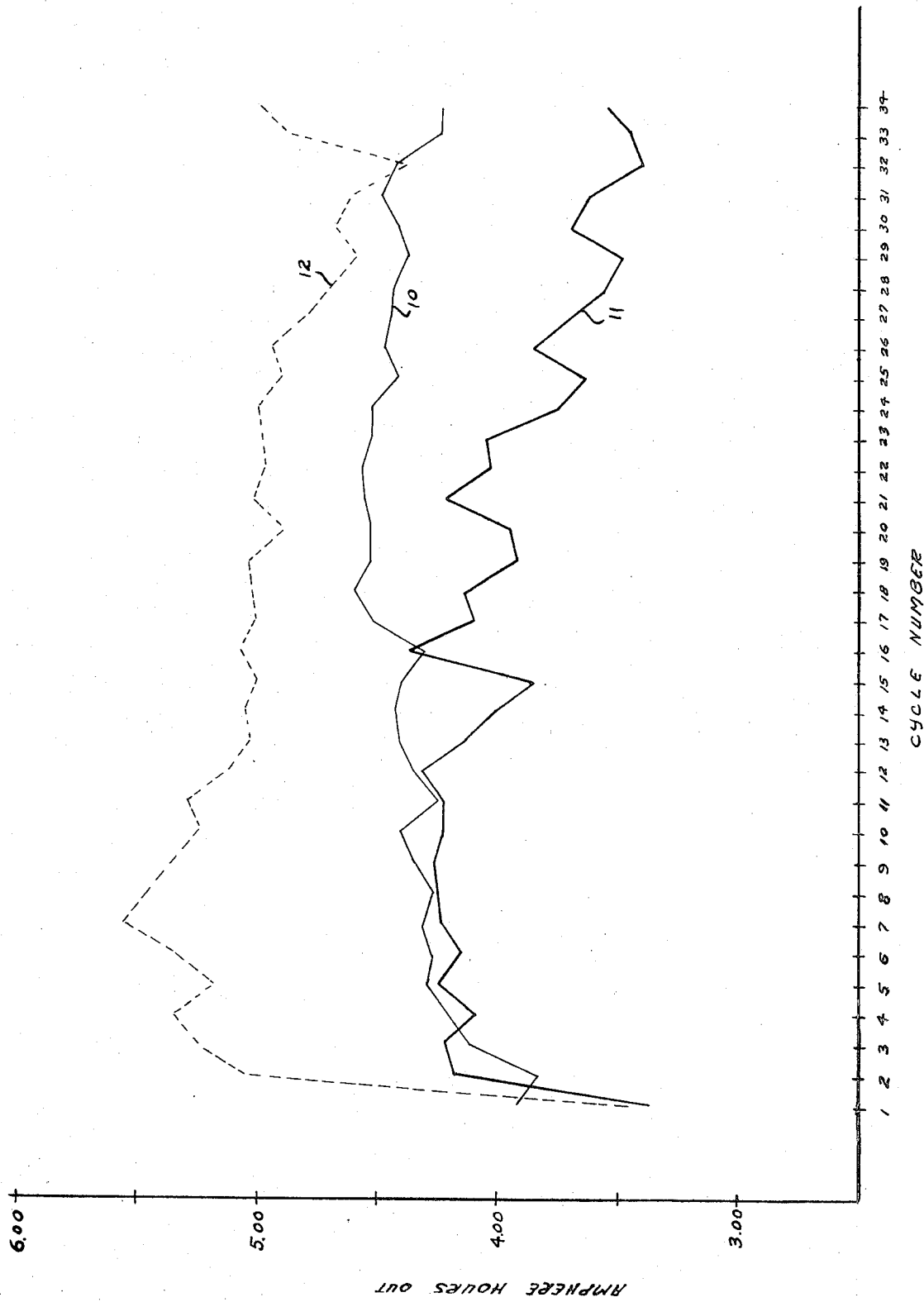

PRODUCTION OF CADMIUM ELECTRODES

FIELD OF THE INVENTION

This invention relates to a method of preparing cadmium electrodes. In one aspect it relates to improved cadmium anodes for use in nickel-cadmium batteries.

BACKGROUND OF THE INVENTION

Several methods for preparing cadmium electrodes are disclosed in the patent literature. The methods usually involve modifications or improvements in a procedure whereby a porous nickel plaque is impregnated with cadmium nitrate solution. After precipitation of cadmium hydroxide in the pores of the plaque by the action of a strong alkaline solution, the plaque is washed and dried. To obtain a sufficient deposit of cadmium hydroxide, it is necessary that the impregnation and precipitation steps be repeated a number of times.

A process that is different from that described in the preceding paragraph is disclosed by G. A. Mueller in U.S. Pat. No. 3,184,338. to this process, a matrix of nickel mesh is immersed in an aqueous cadmium nitrate solution maintained at a temperature of 20°C. Using a plurality of cadmium rods as the anode, a complex of cadmium hydroxide and nitrogenous compounds is deposited in the interstices of the matrix by passing a current through the solution. During the electrodeposition nitric acid is added in order to maintain the solution at a pH between 1.0 and 1.5. The deposited cadmium hydroxide complex is charged to spongy metallic cadmium in a potassium hydroxide electrolytic bath with the matrix as the cathode and a nickel anode. After passing the spongy metallic cadmium matrix through smooth nickel rollers so as to reduce the thickness of the matrix, the spongy metallic cadmium in the rolled matrix is then discharged to cadmium hydroxide under the same conditions as it was charged.

In another electrodeposition process, as disclosed by R. L. Beauchamp in U.S. Pat. No. 3,573,101, each porous nickel plaque is positioned between two platinum anodes in a boiling aqueous solution of cadmium nitrate. A current of 4 to 8 amperes per square meter of plaque area is passed through the solution for a period of 30 minutes to one hour, thereby impregnating the plaques with cadmium hydroxide. During the period of impregnation, an alkali metal nitrite is present in the solution in an amount sufficient to prevent oxygen evolution at the platinum counter-electrodes. Upon completion of the impregnation, the plaques are washed and dried and electrolytically treated in a potassium hydroxide solution so as to reduce the cadmium hydroxide to cadmium metal.

There are several disadvantages in preparing cadmium electrodes in accordance with the prior art processes. The impregnation-precipitation process requires that the steps be repeated several times to obtain anything approaching a satisfactory loading of active material. This is, of course, a time consuming procedure which makes the process economically unattractive. Furthermore, because of the tendency of nitrogenous compounds to deposit in the pores, the loading of cadmium hydroxide is reduced and special steps must be taken to eliminate or reduce the amount of such compounds. The above-described processes involving electrodeposition involve multiple steps, the use of additives to prevent oxygen evolution at inert anodes, and relatively long impregnation times. Also, in the process in which a reducing agent, such as an alkali metal nitrite, is added to the impregnating solution, it is necessary to treat the solution after several impregnations so as to remove the oxidized material, e.g., alkali metal nitrates.

It is an object of this invention, therefore, to provide an improved method for preparing cadmium electrodes that is not subject to the disadvantages of prior art processes.

Another object of the invention is to provide cadmium electrodes suitable for use in nickel-cadmium batteries having a very stable capacity.

A further object of the invention is to provide a single step method for preparing cadmium electrodes that are not subject to the high rate of capacity loss on cycling as are commercially available rechargeable cadmium electrodes.

Other objects and advantages of the invention will become apparent to those skilled in the art upon consideration of the accompanying disclosure and the drawing in which the single FIGURE graphically depicts capacity versus cell life for commercial cadmium electrodes and cadmium electrodes prepared by the method of this invention.

SUMMARY OF THE INVENTION

The present invention resides in a method for preparing negative electrodes which have a high loading of active cadmium. In accordance with the method, a porous nickel plaque is disposed between two cadmium sheets immersed in an aqueous solution of cadmium nitrate having a pH of 3 to 5 and maintained at a temperature ranging from 95° to 110°c. After immersion the nickel plaque is made cathodic and the cadmium sheets are made anodic by being connected, respectively, to the negative pole and the positive pole of a power source. Thereafter, direct current is passed through the solution at a current density of 1.2 to 1.6 amperes per square inch (about 1,860 to 2,480 amperes per square meter) of geometric area of the plaque for a period of 8 to 20 minutes.

By conducting the electrodeposition in the above-described manner, cadmium metal and cadmium hydroxide are deposited in the pores of the nickel plaque. The fact that a portion of the deposited material is cadmium per se provides a cadmium electrode having a greater loading of active material than would otherwise be obtained. However, in order to obtain the high capacity electrode, it is critical that the electrodeposition be conducted under the combination of conditions recited in the preceding paragraph. For example, a relatively high current density is employed for a short period of time. Any substantial deviation from the conditions, e.g., a current density greater than 1.6 amperes per square inch and/or a period longer than 20 minutes, results in the deposition on the surface of the plaque rather than in the pores of the plaque, thereby decreasing the loading of active material. Furthermore, the use of a current density lower than 1.2 ampere per square inch and/or a time shorter than 8 minutes does not result in the high loading of active cadmium. Coupled with the requirements regarding current density and time are those relating to the solution bath. Thus, during conduct of the method, the solution bath must be maintained at a temperature ranging from 95° to 110°C and at a pH of 3 to 5. If the solution were to be maintained at a lower temperature, e.g., at 25°C, and under a more acid condition, e.g., at a pH of 1.5, while carrying out the impregnation of a porous nickel plaque at the high current density specified herein, the pores of the plaque would be filled with an inordinately large amount of nitrogenous compounds. The presence of such compounds greatly reduces the loading of active material and concomitantly lowers an electrode's capacity.

The solution bath generally contains about 1.5 to 3 mols of cadmium nitrate per liter of water. The pH of the solution is conveniently adjusted to a value of 3 to 5, inclusive, by adding the necessary amount, as determined by a pH meter, of a weak nitric acid solution, e.g., 0.1 molar nitric acid.

Upon completion of the impregnation period, the plaque is removed from the solution and washed with deionized water. The washing is conveniently carried out by placing the plaque in a water bath, provided with a stirrer, for a period of about 1 to 3 hours. Thereafter, the washed plaque is dried, preferably in a vacuum oven, which has been purged with an inert gas, such as nitrogen or argon, at a temperature of about 35° to 85°C.

Instead of proceeding with the washing and drying steps at the end of the impregnation period, it is within the scope of the invention to immerse the plaque in aqueous potassium hydroxide between a pair of nickel plates. After making the plaque cathodic and the nickel plates anodic, direct current at 0.25 to 0.75 ampere per square inch of geometric plaque area is passed through the solution for a period of 15 to 45 minutes. The concentration of potassium hydroxide usually ranges from about 15 to 30 weight percent, based upon the weight of the aqueous solution. While this is not a necessary step of the method of this invention, it is often followed in order to remove any cadmium nitrate which may have plated out on the plaque. As a result of the treatment, any nitrate present is converted to the hydroxide and ammonia gas is released. After completion of the treatment, the plaque is removed from the aqueous potassium hydroxide bath and subjected to the washing and drying steps as described in the preceding paragraph.

The porous nickel plaques used in the practice of the method of this invention are of the type conventionally employed in preparing electrodes. The porosities generally range from 70 to 90 percent with a porosity in the range of 83 to 87 percent often being preferred. In one method of producing a porous nickel plaque, a layer of nickel carbonyl powder placed on each side of a nickel screen in a graphite mold is sintered in a non-oxidizing atmosphere at an elevated temperature and pressure.

In the discussion hereinbefore, the method of this invention has been described with relation to the impregnation of a single porous nickel plaque. However, it is to be understood that the method is applicable to the treatment of a plurality of plaques in the same solution bath. In any event each plaque is positioned between a pair of cadmium sheets. Thus, when a plurality of electrodes are fabricated, the number of cadmium sheets utilized as greater by one than the number of plaques. The plaques, which are made cathodic, are connected in parallel while the cadmium sheets serving as anodes are likewise connected in parallel. The dimensions of each of the plaques and each of the cadmium sheets are usually the same. The plaques are generally separated from the sheets by a space of about 0.5 to 1.0 inch.

A more comprehensive understanding of the invention can be obtained by referring to the following illustrative examples which are not intended, however, to be unduly limitative of the invention.

EXAMPLE I

A series of three runs was conducted in each of which a cadmium electrode was prepared in accordance with the method of this invention. The same procedure, as described hereinafter, was followed in each of the runs.

The aqueous solution used was 2.0 molar in cadmium nitrate hydrate [$Cd(NO_3)_2 \cdot 4H_2O$] with no additives being used to buffer the pH of the solution. The sintered nickel plaque, whose dimensions were 3 inch ×3 inch× inch×0.02 inch, had a porosity of 85±2%. After a tab of 270 nickel was spot welded onto the plaque, the plaque was placed between two cadmium sheets (99.9% Cd), each of whose dimensions were 3 inch × 4 inch ×0.60 inch. The cadmium sheets were separated from the plaque by 0.50 inch and were held in place by a Teflon form. Prior to immersing the plaque and sheets in the impregnating solution, the pH of the solution was adjusted to 4.0 with 0.1 molar nitric acid, and its temperature was raised to 104°C. After immersion the plaque was made cathodic by being connected to the negative lead of a power supply while the sheets were made anodic by being connected to the positive lead of the power supply. Deposition of cadmium metal and cadmium hydroxide inside the pores of the plaque was accomplished by passing a direct current of 1.4 amperes per square inch of plaque area (3 inch × 3 inch ×1.4 amps/cm$^2$ = 12.6 amps.) through the cell. The time of passage of current was 8 minutes.

At the end of the impregnation period, the plaque was removed from the solution bath. The plaque was then suspended between two 270 nickel sheets and immersed in 20% aqueous potassium hydroxide. The nickel sheets were separated from the plaque by 0.5 inch. The plaque was made cathodic while the sheets were made anodic. Direct current was passed through the aqueous potassium hydroxide at 0.55 ampere per square inch of plaque area for 30 minutes. The plaque was then removed from the aqueous potassium hydroxide and washed for about 2 hours in deionized water. After drying in a nitrogen atmosphere, the plaque was weighed and its thickness was measured.

Weight gains and thicknesses for the three cadmium electrodes prepared as described above are shown below in Table I.

TABLE I

| Electrode Number | Wt. with tab, g | Wt. After impregnation, g | Wt gain, g | Thickness before, in. | Thickness after, in. |
|---|---|---|---|---|---|
| 1 | 8.2344 | 13.0100 | 4.7756 | 0.0224 | 0.0234 |
| 2 | 7.9596 | 12.6541 | 4.6965 | 0.0227 | 0.0222 |
| 3 | 8.1867 | 12.9177 | 4.7310 | 0.0235 | 0.0235 |

EXAMPLE II

The three electrodes prepared as described in Example I were used to make up an experimental cell. The four positive electrodes employed were taken from an unused 22 ampere-hour aircraft cell. The dimensions of each of these electrodes were 2.75 inch ×3 inch ×0.30 inch. Assuming that all weight gain in the cadmium electrodes is cadmium hydroxide, the electrodes (and hence the cell) had a theoretical capacity of 5.20 ampere-hours. (Faradaic equivalent of $Cd(OH)_2$ in amp-hrs/g × weight gain $g = 0.366 \times 14.2031 = 5.20$ amp-hrs.) The volume of the negative electrodes was 0.6219 cubic inches before the cell was cycled. The plates were separated from one another by single layers of a woven nylon separator. The cell was enclosed in a plexiglass container, and 50cc of 32% aqueous potassium hydroxide was used as the electrolyte. The initial charge on the cell was 12.0 amperes for 25 minutes or 5.0 ampere-hours. The cell was discharged through a diode load bank at 6.0 amperes. A discharge was considered to be complete when a potential reading of +0.25 volt was obtained between the negative plates and a pure cadmium reference bar electrode, which corresponds to about +0.90 volt for the cell voltage. Data showing the electrical performance of the cell during 34 charge-discharge cycles are shown hereinafter in Table II.

TABLE II

| Cycle Number | % Charge | Charging Time (Min) | Discharge Time (Min) | Measured Capacity A-Hrs | % Utilization of Active Material[1] |
|---|---|---|---|---|---|
| 1 | 96.1 | 25.0 | 39.25 | 3.925 | 75.5 |
| 2 | 96.1 | 25.0 | 38.25 | 3.825 | 73.5 |
| 3 | 115.4 | 30.0 | 41.15 | 4.115 | 79.1 |
| 4 | 115.4 | 31.0 | 42.00 | 4.200 | 81.0 |
| 5 | 123.1 | 32.0 | 42.86 | 4.286 | 82.4 |
| 6 | 126.9 | 33.0 | 42.65 | 4.265 | 82.0 |
| 7 | 126.9 | 33.0 | 43.15 | 4.315 | 83.0 |
| 8 | 115.4 | 34.0 | 42.63 | 4.263 | 82.0 |
| 9 | 134.6 | 35.0 | 43.46 | 4.346 | 83.6 |
| 10 | 142.3 | 37.0 | 44.01 | 4.401 | 84.6 |
| 11 | 146.1 | 38.0 | 42.26 | 4.226 | 81.3 |
| 12 | 153.8 | 40.0 | 43.38 | 4.338 | 83.4 |
| 13 | 161.5 | 42.0 | 43.95 | 4.395 | 84.5 |
| 14 | 165.4 | 45.0 | 44.20 | 4.420 | 85.0 |
| 15 | 180.8 | 47.0 | 43.80 | 4.380 | 84.2 |
| 16 | 188.5 | 49.0 | 43.01 | 4.301 | 82.6 |
| 17 | 192.3 | 50.0 | 45.20 | 4.520 | 86.9 |
| 18 | 196.1 | 51.0 | 45.97 | 4.597 | 88.9 |
| 19 | 200.0 | 52.0 | 45.20 | 4.520 | 86.9 |
| 20 | 203.8 | 53.0 | 45.22 | 4.522 | 87.0 |
| 21 | 134.6 | 35.0 | 45.48 | 4.548 | 87.5 |
| 22 | 173.1 | 45.0 | 45.58 | 4.558 | 87.7 |
| 23 | 153.8 | 40.0 | 45.10 | 4.510 | 86.7 |
| 24 | 192.3 | 50.0 | 45.10 | 4.510 | 86.8 |
| 25 | 153.8 | 40.0 | 44.08 | 4.408 | 84.8 |
| 26 | 115.4 | 30.0 | 44.70 | 4.470 | 86.0 |
| 27 | 123.1 | 32.0 | 44.35 | 4.435 | 85.3 |
| 28 | 134.6 | 35.0 | 44.25 | 4.425 | 85.1 |
| 29 | 134.6 | 35.0 | 43.68 | 4.368 | 84.0 |
| 30 | 192.3 | 50.0 | 44.05 | 4.405 | 84.7 |
| 31 | 192.3 | 50.0 | 44.78 | 4.478 | 86.1 |
| 32 | 192.3 | 50.0 | 44.20 | 4.420 | 85.0 |
| 33 | 134.6 | 35.0 | 42.30 | 4.230 | 81.2 |
| 34 | 192.3 | 50.0 | 42.17 | 4.217 | 79.9 |

[1] Based on theoretical capacity of 5.20 ampere-hours.

EXAMPLE III

Cadmium electrodes taken from two unused 22 ampere-hour aircraft cells were used in forming cells similar to the cell of Example I. The cells, designated as Cell A and Cell B, were given charge/discharge cycling similar to that described in Example II. Thus, as in Example II, the cells were overcharged about 2 ampere-hours for each charge as determined from the previous discharge. A charging current of 12 amperes were used, and each discharge was at a rate of 6 amperes. The end of discharge was determined by monitoring the potential between a cadmium bar reference electrode and the negative plates. The end of discharge potential was 0.25 volt. Data showing the results of the cycling are shown hereinafter in Table III.

TABLE III

| Cycle Number | Cell A Chg Time (Minutes) | Cell A Disc Time (Minutes) | Cell A Measured Capacity | Cell B Chg Time (Minutes) | Cell B Disc Time (Minutes) | Cell B Measured Capacity |
|---|---|---|---|---|---|---|
| 1 | 25 | 33.5 | 3.35 | 25 | 34.35 | 3.435 |
| 2 | 27 | 41.74 | 4.174 | 27.2 | 50.35 | 5.036 |
| 3 | 28 | 42.2 | 4.22 | 35.18 | 52.3 | 5.23 |
| 4 | 26 | 40.8 | 4.08 | 30.0 | 53.5 | 5.35 |
| 5 | 30 | 42.33 | 4.233 | 32.0 | 51.78 | 5.178 |
| 6 | 32 | 41.5 | 4.15 | 38.0 | 53.45 | 5.345 |
| 7 | 32.5 | 42.36 | 4.236 | 40.0 | 55.38 | 5.538 |
| 8 | 31.0 | 42.47 | 4.247 | 40.0 | 54.25 | 5.425 |
| 9 | 31.0 | 42.7 | 4.27 | 40.0 | 53.29 | 5.329 |
| 10 | 30.0 | 42.25 | 4.225 | 38.0 | 52.2 | 5.22 |
| 11 | 32.0 | 42.25 | 4.225 | 38.0 | 52.7 | 5.27 |
| 12 | 32.5 | 43.1 | 4.31 | 38.0 | 52.35 | 5.235 |
| 13 | 32.0 | 41.3 | 4.13 | 37.0 | 50.15 | 5.015 |
| 14 | 32.0 | 40.15 | 4.015 | 38.0 | 50.45 | 5.045 |
| 15 | 31.0 | 38.4 | 3.84 | 38.0 | 49.37 | 4.937 |
| 16 | 35.0 | 43.6 | 4.36 | 39.0 | 50.53 | 5.053 |
| 17 | 34.0 | 40.93 | 4.093 | 38.0 | 49.78 | 4.978 |
| 18 | 34.0 | 41.44 | 4.144 | 38.5 | 50.02 | 5.002 |
| 19 | 33.0 | 39.15 | 3.915 | 37.0 | 50.17 | 5.017 |
| 20 | 30.0 | 39.4 | 3.94 | 35.0 | 50.02 | 5.002 |
| 21 | 30.0 | 42.15 | 4.215 | 35.0 | 50.02 | 5.002 |
| 22 | 32.5 | 40.3 | 4.03 | 37.0 | 49.17 | 4.917 |
| 23 | 32.0 | 40.5 | 4.05 | 37.0 | 49.38 | 4.938 |
| 24 | 32.0 | 37.4 | 3.74 | 37.0 | 49.7 | 4.97 |
| 25 | 30.0 | 36.27 | 3.627 | 36.0 | 48.84 | 4.884 |
| 26 | 31.0 | 38.46 | 3.846 | 37.0 | 49.75 | 4.975 |
| 27 | 30.0 | 47.0 | 3.70 | 35.5 | 47.95 | 4.795 |

TABLE III — Continued

| Cycle Number | Cell A Chg Time (Minutes) | Cell A Disc Time (Minutes) | Cell A Measured Capacity | Cell B Chg Time (Minutes) | Cell B Disc Time (Minutes) | Cell B Measured Capacity |
|---|---|---|---|---|---|---|
| 28 | 30.5 | 35.56 | 3.556 | 36.0 | 46.88 | 4.688 |
| 29 | 29.0 | 34.83 | 3.483 | 36.0 | 45.77 | 4.577 |
| 30 | 30.0 | 37.0 | 3.70 | 34.0 | 46.7 | 4.67 |
| 31 | 30.0 | 36.16 | 3.616 | 35.0 | 46.0 | 4.60 |
| 32 | 29.0 | 34.13 | 3.413 | 34.0 | 43.57 | 4.357 |
| 33 | 28.5 | 34.54 | 3.454 | 34.3 | 48.7 | 4.87 |
| 34 | 29.0 | 35.6 | 3.56 | 36.0 | 49.83 | 4.983 |

Reference is now made to the drawing which shows three graphs plotted from data obtained in the runs described in Examples II and III. Curve 10 is based upon data obtained with the cell of Example II which utilized cadmium electrodes prepared by the method of this invention. Curves 11 and 12 are based upon data obtained with Cell A and Cell B which used commercial cadmium electrodes. From an examination of the curves, which show capacity versus cycle life, it is seen that the cadmium electrodes of this invention exhibited an improved capacity stability as compared to the commercial electrodes. Thus, curve 10 shows that there is less deviation in measured capacities of the invention electrode as compared to the measured capacities represented by curves 11 and 12 for the commercial electrodes.

More quantatively, the standard deviations for capacities of Cell A, Cell B, and the invention cell of Example II are ±0.0501, ±0.0634, and ±0.0292, respectively. Thus, average capacities over the 34 cycles for each of the cells are as follows:

Cell A – 3.946±0.0501 ampere-hours
Cell B — 4.967±0.0634 ampere-hours
Invention Cell — 4.357±0.0292 ampere-hours The weights of each set of negative plates after cycling were as follows:

Cell A — 45.3562 grams
Cell B — 49.2340 grams
Invention Cell — 39.4867 grams From the foregoing, the capacity per pound for each cell is determined to be as follows:
Cell A — 39.7 amp-hrs/lb
Cell B — 45.8 amp-hrs/lb
Invention Cell — 50.1 amp-hrs/lb

EXAMPLE IV

Following substantially the same procedure described in Example I, twelve cadmium electrodes were prepared. The impregnating solution was 2.0 molar in cadmium nitrate. The cathodes were two sintered porous nickel plaques having dimensions of 8.25 inches ×9.50 inches and 0.02 inch coined into twelve electrodes of dimensions 4.75 inches ×2.75 inches ×0.02 inch. The anodes were three cadmium plates (99.9% cadmium) having dimensions of 8.25 inches ×9.50 inches ×0.125 inch. The solution had an adjusted pH of 4.0 and was at a temperature of 100° to 102°C. Deposition of cadmium metal and cadmium hydroxide within the pores of the plaque was accomplished by passing a direct current of about 1.5 amperes per square inch of plaque area for a period of 15 minutes.

The electrodes obtained had 2.33 grams per cubic centimeter of void volume with a theoretical capacity of 73 ampere-hours per pound and 11 ampere-hours per cubic inch. These data demonstrate that the method of this invention is particularly suitable for use in preparing cadmium electrodes on a commercial scale. Actually, the multiple electrodes prepared in the run of Example IV are superior to the three electrodes prepared under similar conditions in the runs of Example I.

From the foregoing, it is seen that the method of this invention provides a simplified procedure for preparing cadmium electrodes that are superior to commercial cadmium electrodes. The present cadmium electrodes alleviate the high rate of capacity loss on cycling that is experienced with commercially available rechargeable cadmium electrodes. Furthermore, because it is unnecessary to add a reducing agent, such as an alkali metal nitrite, to the impregnating solution, there is no build-up of salts in the solution. As a result the solution can be reused without treatment to remove foreign salts, such as alkali metal nitrates. The electrodes are particularly suitable for use in nickel-cadmium batteries where weight is a factor as in satellite batteries. For example, use of the cadmium electrode of this invention in a battery for a 2,500 pound satellite can result in a weight savings of 60 to 70 pounds.

As will be evident to those skilled in the art, various modifications of this invention can be made or following in view of the foregoing disclosure without departing from the spirit and scope of the invention.

I claim:

1. A method for preparing a cadmium electrode which comprises the steps of positioning in an aqueous solution of cadmium nitrate a sintered porous nickel plaque having a porosity of about 70 to 90% between a pair of cadmium sheets, the solution having a pH of 3 to 5 and being at a temperature ranging from 95° to 110°C; connecting the nickel plaque to the negative pole and the cadmium sheets to the positive pole of a source of direct current; and passing direct current through the solution at a current density of 1.2 to 1.6 amperes per square inch of geometric area of the sintered porous nickel plaque for a period of 8 to 20 minutes, thereby depositing cadmium metal and cadmium hydroxide in the pores of the nickel plaque.

2. The method according to claim 1 in which a plurality of said sintered porous nickel plaques are positioned in the solution, each plaque being disposed between a pair of cadmium sheets; the nickel plaques are connected to the negative pole and the cadmium sheets are connected to the positive pole of a source of direct current, and direct current is passed through the solution at a current density of 1.2 to 1.6 amperes per square inch of total geometric area of the plaques.

3. The method according to claim 1 in which the aqueous solution contains about 1.5 to 3.0 mols of cadmium nitrate per liter of water.

4. The method according to claim 13 in which the plaque is removed from the solution at the end of the period and immersed in aqueous potassium hydroxide solution between a pair of nickel plates; the plaque is connected to the negative pole and the sheets are connected to the positive pole of a source of direct current; and direct current is passed through the aqueous potassium hydroxide solution at a current density of 0.25 to 0.75 ampere per square inch of geometric area of the plaque for a period of 15 to 45 minutes.

5. The method according to claim 4 in which the concentration of potassium hydroxide ranges from about 15 to 30 weight percent, based upon the weight of the aqueous solution.

6. The method according to claim 4 in which the plaque is removed from the aqueous potassium hydroxide solution at the end of the period, washed with deionized water, and dried in a vacuum oven at a temperature ranging from about 75° to 85°C.

7. The method according to claim 3 in which the plaque is removed from the solution at the end of the period, washed with deionized water, and dried in a vacuum oven at a temperature ranging from about 35° to 85°C.

* * * * *

UNITED STATES PATENT OFFICE
CERTIFICATE OF CORRECTION

PATENT NO. : 3,873,368
DATED : March 25, 1975
INVENTOR(S) : David F. Pickett

It is certified that error appears in the above-identified patent and that said Letters Patent are hereby corrected as shown below:

Col. 4, line 25, delete "X inch".  Col. 9, line 1, change "13" to -- 3 ---.

Signed and Sealed this twenty-second Day of July 1975

[SEAL]

Attest:

RUTH C. MASON
Attesting Officer

C. MARSHALL DANN
Commissioner of Patents and Trademarks